United States Patent Office 3,359,310
Patented Dec. 19, 1967

3,359,310
PROCESS FOR PRODUCING POTASSIUM MALONATE
Bernhard Raecke, Dusseldorf, Germany, assignor to Henkel & Cie G.m.b.H., Dusseldorf, Germany, a corporation of Germany
No Drawing. Filed July 14, 1964, Ser. No. 382,638
Claims priority, application Germany, July 27, 1963, H 49,852
10 Claims. (Cl. 260—537)

ABSTRACT OF THE DISCLOSURE

Novel production of potassium malonate by reacting potassium acetate with carbon dioxide.

---

This invention relates to a new process for preparing potassium malonate or malonic acid.

It has now been found that the potassium salt of malonic acid can be produced by reacting under pressure potassium acetate with carbon dioxide at temperatures above 200° C. If desired, the produced potassium malonate can be converted to the free acid by treatment with acids.

The carbon dioxide reacts with the potassium acetate in such a way that a new carboxyl group is formed which is neutralized by acid binding agents further described below. The reaction takes place probably according to the following equations:

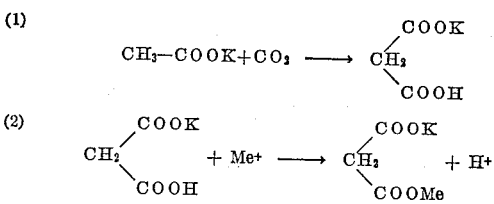

The potassium acetate used as the starting material for the inventive process should preferably be used in as dry condition as possible.

The salt can be converted by known procedures into a dry powder, preferably through spraydrying, and if necessary further dried to remove the remaining small amounts of moisture.

In place of potassium acetate, reaction mixtures can be used, which form this salt. Thus, mixtures of other salts are suitable, for example, sodium acetate or heavy metal acetates with potassium carbonate or other potassium salts of weak acids. Also derivatives of acetic acid, such as acetic anhydride, acetonitrile and acetic acid esters can be used together with potassium carbonate. All of these mixtures do not need to be present in stoichiometric proportions.

The potassium acetate, according to the invention, is reacted with carbon dioxide under pressure. For this, the pressure can vary between very wide limits. The process can be worked with comparatively low pressures, for example about 10 to 15 atmospheres. For obtaining good yields it is in general appropriate to use a pressure of from about 300 to 500 atmospheres (at the reaction temperature). Higher pressure is merely limited by apparatus employed. The pressure can amount to 1000 to 2000 atmospheres and more. The pressure can be produced by suitable pumps or compressors. For laboratory experiments the process could be conducted, for example, in such a way that liquid carbon dioxide is filled into the cooled and evacuated reaction vessel from a storage container. In place of liquid carbon dioxide, solid carbon dioxide can be used. The carbon dioxide can be recycled just the same as the supplementary materials described below.

For achieving a reaction fast enough for technical purposes, generally temperatures above 200° C. are necessary. The upper limit of the temperature is set by the decomposition temperature of the potassium malonate and the remaining organic substances used in the reaction. In general it is not advantageous to employ temperatures above 400° C. However, temperatures to about 450° C. can be used if decomposition is counteracted by raising the pressure.

The reaction requires only a short time. It can, however, require several hours with large reaction masses on account of the time necessary for the heating and cooling of the apparatus employed. It should be noted, that local overheating of the mass at the start of the heating process must be avoided, as it could lead to decomposition. For this reason, too rapid heating is to be avoided.

It is advantageous to conduct the reaction of the invention in the presence of acid binding agents whereby, as shown in the above formulas, the carboxyl groups newly formed are neutralized and therewith stabilized. For this purpose, preferably alkaline reacting potassium salts are used, for example, potassium carbonate, bicarbonate, formate or oxalate. Potassium carbonate is preferably used. The acid binding agents do not have to be used in stoichiometric amounts. For obtaining good yields it is advantageous to use at least as much potassium carbonate so that all of the carboxyl groups newly formed by the reaction can be neutralized. It is considered advantageous to use an amount in excess of that needed.

Since water is formed by the neutralization of the newly formed carboxyl groups, it is advantageous, to add compounds to the reaction mixture to bind the water formed or the water still present in the basic substance, or compounds capable of reacting with it.

Such materials are, for example, different metallic carbides, such as aluminum carbide or calcium carbide. Also suitable are other metallic compounds, especially those metals of the first and third groups of the periodic system, for example, the nitrides or borides. As water binding agents are further suitable potassium cyanate and other alkali metal salts of cyanic acid or known salts of derivatives or polymers of cyanic acid. Suitable polymers or derivatives are, for example, cyanuric acid, cyanamide or dicyandiamide. Preferably used in these cases are the potassium salts.

As water binding agents, also suitable salts can be used, for example, alkali metal carbonates, in particular potassium carbonate. The potassium carbonate, in this case, must be present in the reaction mixture in an amount in excess of the necessary amount of that used to neutralize the newly formed carboxyl groups. The suitability of potassium carbonate as water binding agents depends manifestly upon the formation of bicarbonates which takes place under carbon dioxide pressure in spite of the high temperature.

As already indicated, it is advantageous in the inventive reaction to avoid the presence of large amounts of water. Furthermore, the presence of large amounts of oxygen should be avoided.

We have further found that the inventive reaction can be catalytically influenced by a quantity of metals or metal compounds. As especially effective catalysts have proven to be the metals such as iron, bismuth, zinc, or their compounds, for example, their oxides or their salts with inorganic or organic acids, among others their carbonates, bicarbonates, halogenides, sulfates, acetates, formiates, oxalates or fatty acid salts.

A distinct improvement in the yield was shown by the metals nickel, titanium, chromium, or their compounds.

The quantity of the catalyst can vary within wide limits and can amount from 0 to 15, preferably 0.5 to 5% by weight, based on the reaction mixture. The catalysts can be especially finely divided in the reaction mixture by converting an aqueous solution of the starting materials, which contain the catalysts dissolved or suspended therein, into a dry powder by spray drying or other means. The recited catalysts can also be used in combination with a carrier material, for example, Kieselgur.

It has further been proved advantageous to mix the starting material with inert materials to improve the mechanical characteristics of the reaction mixture. Suitable additives are, for example, sand, rockdust, metal powder, metal dust, metal turnings, inert salts, such as sodium chloride, potassium chloride, or potassium sulfate and the like. Especially suitable are materials with a large surface area, such as activated charcoal, powdered or granulated coke, lamp black or other forms of finely divided carbon, finely divided silicic acid such as commercially used as a filler for rubber, or Kieselgur. Also metal oxides, such as finely divided aluminum oxide, can be used.

The amount of inert additives can vary within wide limits and in general depends on the physical characteristics of the salts used, as well as from the capacity of the apparatus. It is understood, of course, that under similar circumstances the quantities of the additives are kept as small as possible, to advantageously obtain the most efficient capacity of the apparatus. One can, however, when this factor is not considered, increase the additive to such an amount, that 80% or more of the inserted mixture consists of the inert additives.

Through these inert additives, the mechanical and physical characteristics of the reaction mixture are improved, lumping or caking during the reaction are reduced or completely eliminated. Thus, the technical performance of the process is greatly facilitated.

Finally, it is also possible to conduct the reaction in the presence of inert liquid diluents. For this, such liquids are suitable, which do not undergo decomposition under the temperatures used, for example, benzene, naphthalene, diphenyl, ditolyl or diphenyl ether. The amount of the diluent is advantageously chosen so that a pumpable mixture is obtained.

The execution of the invention process can be carried out either in a discontinuous (batch) or continuous manner. It is, for example, also possible to use the moving bed or fluidized bed processes. In the batch process it is appropriate to use stirring or rolling autoclaves as reaction vessels.

For working up the reaction mixture, the mixture is dissolved in water, any possible impurities or catalysts are filtered and, through addition of inorganic or organic acidic materials, such as hydrochloric acid, sulfuric acid, phosphoric acid, bisulfate or acetic acid, the formed malonic acid is converted to the free acid. Through boiling down of the solution, and extracting with suitable solvents, and by other known methods, the malonic acid can be isolated.

The formed potassium malonate can, of course, be used in the raw condition or after adequate purification can be used directly for the production of derivatives of malonic acid, for example, halogenides, esters or amides.

The following specific examples are presented to illustrate the invention and to enable persons skilled in the art to better understand and practice the invention and are not intended to be limitative.

Examples

In the following examples, unless otherwise noted, the following procedure was used: The dry starting materials were intimately mixed by milling in a ball mill and heated in an autoclave of 500 ccm. capacity under pressure of carbon dioxide.

Under "initial pressure" is understood the carbon dioxide pressure in the autoclave before the beginning of heating. This pressure was in each case measured at 50° C. taking into account the critical temperature of the carbon dioxide. Under "final pressure" is understood the maximum pressure observed at the corresponding reaction temperature.

In many cases the autoclave was provided with a glass insert. The corresponding experiments are indicated by G in the following tables.

For working up the reaction mixture, the raw product was dissolved in water and filtered hot. The filtrate was acidified after cooling with concentrated hydrochloric acid and thereafter evaporated to dryness under vacuum. The salt obtained was repeatedly extracted with absolute alcohol. When necessary, the extract was treated with activated charcoal, filtered and again evaporated. As yield was indicated the weight of the pure malonic acid obtained in this way, which was identified through acid number, melting point, mixture-melting point, and conversion into the diamide.

In order to determine if this method of working up causes any loss of the malonic acid formed, a series of eight comparison tests were carried out, in which a known quantity of malonic acid was thoroughly mixed with potassium carbonate and cadmium oxide and worked up in the same manner. In these eight test runs, an average of about 90% of the malonic acid was recovered. This means, that in the following described tests the stated yields represent only about 90% of the amount of malonic acid actually formed.

Examples 1 to 4

Starting material:
    Potassium acetate _____ g__ 30
    Anhydrous potassium carbonate _____ g__ 120
    Cadmium oxide _____ g__ 2
Time of heating _____ hours__ 3
Reaction temperature _____ ° C__ 350

The initial and final pressure as well as the yield obtained are given in the following tables.

TABLE I

| Example | Initial pressure, atmos. | Final pressure, atmos. | Yield, percent | Remarks |
|---|---|---|---|---|
| 1 | 200 | 1,480 | 53.8 | |
| 2 | 70 | 310 | 8.4 | |
| 3 | 40 | 155 | 21.4 | |
| 4 | 17 | 80 | 9.5 | |

Examples 5 to 10

Starting material:
    Potassium acetate _____ g__ 30
    Anhydrous potassium carbonate _____ g__ 120
    Cadmium oxide _____ g__ 2
    Finely divided silicic acid (Aerosil) _____ g__ 12
Time of heating _____ hours__ 3

TABLE II

| Example | Reaction temperature, ° C. | Initial pressure, atmos. | Final pressure, atmos. | Yield, percent | Remarks |
|---|---|---|---|---|---|
| 5 | 200 | 150 | 260 | 4.1 | |
| 6 | 250 | 100 | 300 | 42.8 | |
| 7 | 300 | 100 | 300 | 41.2 | |
| 8 | 350 | 185 | 1,170 | 40.6 | |
| 9 | 400 | 70 | 225 | 2.2 | |
| 10 | 400 | 160 | 1,450 | 22.8 | |

Examples 11 to 15

Starting material:
    Potassium acetate _____ g__ 30
    Anhydrous potassium carbonate _____ g__ 120
    Aerosil _____ g__ 12
Time of heating _____ hours__ 3
Reaction temperature _____ ° C__ 300
Initial pressure _____ atmospheres__ 100

TABLE III

| Example | Catalyst | Final pressure, atmos. | Yield, percent | Remarks |
|---|---|---|---|---|
| 11 | | 460 | 36.7 | |
| 12 | 2 g. ZnO | 610 | 44.0 | |
| 13 | 2 g. Cd-acetate | 375 | 40.0 | |
| 14 | 2 g. Al₄C₃ | 450 | 44.7 | |
| 15 | 2 g. Cu | 500 | 41.2 | |

*Examples 16 to 28*

Starting material:
    Potassium acetate _____ g__ 15
    Anhydrous potassium carbonate _____ g__ 60
    Aerosil _____ g__ 6
Time of heating _____ hours__ 3
Reaction temperature _____ °C__ 300

TABLE IV

| Example | Catalyst | Initial pressure, atmos. | Final pressure, atmos. | Yield, percent | Remarks |
|---|---|---|---|---|---|
| 16 | 1 g. Al₂O₃ | 120 | 600 | 33.6 | G |
| 17 | 1 g. basic aluminum acetate | 100 | 490 | 31.0 | G |
| 18 | 1 g. aluminum powder | 100 | 690 | 42.1 | G |
| 19 | 1 g. hydrated nickel powder | 100 | 690 | 57.7 | G |
| 20 | 1 g. titanium powder | 100 | 900 | 61.3 | G |
| 21 | 1 g. bismuth powder | 100 | 830 | 71.0 | G |
| 22 | ____do____ | 40 | 85 | 9.5 | G |
| 23 | 1 g. chromium powder | 100 | 740 | 55.2 | G |
| 24 | 1 g. zinc powder | 100 | 1,050 | 72.7 | G |
| 25 | 3 g. iron powder | 100 | 655 | 63.3 | G |
| 26 | 3 g. tin powder | 100 | 860 | 25.3 | G |
| 27 | 1 g. magnesium poder | 100 | 770 | 26.6 | G |
| 28 | 3 g. coarse cadmium powder | 110 | 590 | 33.8 | G |

*Examples 29 to 33*

Starting material:
    Potassium acetate _____ g__ 15
    Anhydrous potassium carbonate _____ g__ 60
    Aerosil _____ g__ 6
Time of heating _____ hours__ 3
Reaction temperature _____ °C__ 300

TABLE V

| Example | Catalyst | Initial pressure, atmos. | Final pressure, atmos. | Yield, percent | Remarks |
|---|---|---|---|---|---|
| 29 | | 100 | 310 | 34.2 | G |
| 30 | 1 g. iron powder | 100 | 875 | 75.2 | G |
| 31 | 1 g. Fe₂O₃ | 110 | 300 | 58.2 | G |
| 32 | 1 g. reduced iron | 100 | 550 | 52.0 | G |
| 33 | 0.5 g. iron powder | 100 | 410 | 63.0 | G |

*Examples 34 to 37*

Starting material:
    Potassium acetate _____ g__ 15
    Anhydrous potassium carbonate _____ g__ 60
    Aerosil _____ g__ 6
    Iron powder _____ g__ 1
Reaction temperature _____ °C__ 300

TABLE VI

| Example | Duration of heating (hours) | Initial pressure, atmos. | Final pressure, atmos. | Yield, percent | Remarks |
|---|---|---|---|---|---|
| 34 | 1 | 100 | 950 | 57.0 | G |
| 35 | 2 | 100 | 720 | 62.0 | G |
| 36 | 4 | 120 | 1,055 | 67.2 | G |
| 37 | 6 | 100 | 620 | 57.0 | G |

*Examples 38 and 39*

Starting material:
    Potassium acetate _____ g__ 15
    Anhydrous potassium carbonate _____ g__ 60
    Aerosil _____ g__ 6
    Iron powder _____ g__ 1
Time of heating _____ hours__ 3

TABLE VII

| Example | Reaction temperature, °C. | Initial pressure atmos. | Final pressure atmos. | Yield, percent | Remarks |
|---|---|---|---|---|---|
| 38 | 275 | 120 | 665 | 52.6 | |
| 39 | 325 | 100 | 810 | 67.7 | |

*Examples 40 and 41*

Starting material:
    Potassium acetate _____ g__ 15
    Anhydrous potassium carbonate _____ g__ 60
    Aerosil _____ g__ 6
    Fe-powder _____ g__ 1
Time of heating _____ hours__ 3
Reaction temperature _____ °C__ 300

TABLE VIII

| Example | Initial pressure, atmos. | Final pressure, atmos. | Yield, percent | Remarks |
|---|---|---|---|---|
| 40 | 40 | 100 | 14.5 | |
| 41 | 50 | 290 | 43.0 | |

*Examples 42 to 47*

Starting material:
    Of the starting material of Table IX _____ g__ 15
    Anhydrous potassium carbonate _____ g__ 60
    Aerosil _____ g__ 6
    Cadmium oxide _____ g__ 1
Time of heating _____ hours__ 3
Reaction temperature _____ °C__ 350
Initial pressure _____ atmospheres__ 100

TABLE IX

| Example | Starting material | Yield, percent | Remarks |
|---|---|---|---|
| 42 | Lithium acetate | 14.6 | G |
| 43 | Sodium acetate | 35.5 | G |
| 44 | Aluminum acetate | 11.8 | G |
| 45 | Zinc acetate | 27.0 | G |
| 46 | Cadmium acetate | 37.7 | G |
| 47 | Lead acetate | 47.0 | G |

*Examples 48 to 50*

Starting material:
  Potassium acetate _____g__ 30
  No potassium carbonate.
  Aerosil _____g__ 12
  Catalyst according to following Table X __g__ 2

TABLE X

| Example | Catalyst | Duration of heating (hours) | Reaction temperature, °C. | Initial pressure, atmos. | Yield, percent | Remarks |
|---|---|---|---|---|---|---|
| 48 | 2 g. iron powder | 3 | 300 | 110 | 2.5 | G |
| 49 | 2 g. cadmium oxide | 3 | 300 | 120 | 4.8 | |
| 50 | ___do___ | 3 | 250 | 120 | 2.5 | |

*Example 51*

Starting material:
  Potassium acetate [1] _____g__ 15
  Potassium carbonate [1] _____g__ 21.5
  Aerosil _____g__ 6
  Cadmium oxide _____g__ 2
Time of heating _____hours__ 3
Reaction temperature _____° C__ 300
Initial pressure _____atmospheres__ 100
Final pressure _____do____ 700
Yield _____percent__ 36.7

[1] Mol ratio 1:1.

*Examples 52 and 53*

The following examples were carried out in a stirrer autoclave of 1 liter capacity.

Starting material:
  Potassium acetate _____g__ 30
  Potassium carbonate _____g__ 120
  Of the materials noted in Table XI ____ccm__ 200
Time of heating _____hours__ 3
Reaction temperature _____° C__ 300

TABLE XI

| Example | Catalyst | Diluent | Initial pressure, atmos. | Final pressure, atmos. | Yield, percent | Remarks |
|---|---|---|---|---|---|---|
| 52 | 2 g. iron powder | Paraffin oil | 60 | 195 | 20.0 | |
| 53 | 1 g. iron powder | Benzol | 63 | 245 | 22.6 | |

*Examples 54 and 55*

Starting material:
  Potassium acetate _____g__ 15
  Potassium carbonate _____g__ 60
  Aerosil _____g__ 6
  Of the catalysts given in Table XII ___g__ 1
Time of heating _____hours__ 3
Reaction temperature _____° C__ 250

TABLE XII

| Example | Catalyst | Initial pressure, atmos. | Final pressure, atmos. | Yield, percent | Remarks |
|---|---|---|---|---|---|
| 54 | Bismuth powder | 100 | 460 | 51.9 | G |
| 55 | Iron powder | 140 | 800 | 51.0 | G |

While certain specific examples and preferred modes of practice of the invention have been set forth it will be understood that this is solely for the purpose of illustration and that various changes and modifications may be made without departing from the spirit of the disclosure and the scope of the appended claims.

I claim:

1. A process for the production of the potassium salt of malonic acid which comprises reacting potassium acetate with carbon dioxide at temperatures of above 200° C. under pressures of 10 to 2000 atmospheres to form the potassium salt of malonic acid.

2. Ahe process according to claim 1 wherein the potassium salt of malonic acid produced is treated with an acid to obtain the free malonic acid.

3. The process according to claim 1, wherein the reaction is carried out in the presence of an acid binding agent.

4. The process according to claim 1, wherein the reaction is carried out in the presence of potassium carbonate.

5. The process according to claim 1, wherein the reaction is carried out in the presence of a water-binding agent.

6. The process according to claim 1, wherein the reaction is carried out in the presence of a catalyst selected from the group consisting of iron, bismuth and zinc, the oxides of the said metals and the inorganic and organic acid salts of said metals.

7. The process according to claim 6, wherein the catalyst is selected from the group consisting of iron, bismuth and zinc.

8. The process according to claim 1, wherein the reaction is carried out in the presence of an inert diluent.

9. The process according to claim 1, wherein the potassium acetate is formed in situ.

10. A process for the preparation of the potassium salt of malonic acid which comprises reacting potassium acetate with carbon dioxide at a temperature of 200 to 450° C. and at a pressure of 10 to 2000 atmospheres in the presence of a water-binding agent, 0 to 80 percent of an inert diluent and 0 to 15 percent of a catalyst selected from the group consisting of iron, bismuth and zinc, the oxides of the said metals and the inorganic and organic acid salts of said metals.

References Cited

UNITED STATES PATENTS 2,852,559   9/1958   Pree et al. _____ 260—537

LORRAINE A. WEINBERGER, *Primary Examiner.*

V. GARNER, *Assistant Examiner.*